United States Patent
Knapp

[11] 3,778,881
[45] Dec. 18, 1973

[54] CYLINDER END ASSEMBLY
[76] Inventor: Peter A. Knapp, 17 Albany St., Wollaston, Mass.
[22] Filed: Nov. 29, 1972
[21] Appl. No.: 310,479

[52] U.S. Cl. .................. 29/401, 277/9, 277/111
[51] Int. Cl. .................... B23p 7/00, F16j 15/18
[58] Field of Search .............. 277/1, 9, 32, 102, 277/110, 111; 29/401

[56] References Cited
UNITED STATES PATENTS
| | | | |
|---|---|---|---|
| 1,678,946 | 7/1928 | Joyce | 277/111 |
| 2,002,713 | 5/1935 | Penick et al. | 277/111 |

Primary Examiner—Herbert F. Ross
Assistant Examiner—Robert L. Smith
Attorney—C. Yardley Chittick et al.

[57] ABSTRACT
A method of repairing or reworking a cylinder end assembly used in a prior art hydraulic or pneumatic cylinder and the resulting improved cylinder end assembly. A conventional Leach 2R-1006 type cylinder which has been damaged (or which has been deemed ready for replacement) is repaired or reworked primarily by modifying its packing gland. The packing gland flange is cut off, the wiper ring groove is relocated, the wire, screws and nuts which were used to prevent packing gland rotation are discarded, the snap ring is discarded, and the V-packing is dug out and discarded.

Then, a new O-ring and fluid sealing ring are installed on the top head, a new wiper ring is installed on the packing gland, and the packing gland is screwed tightly into the top head. This assembly is then slidably inserted into the cylinder weldment and new curved locking segments are inserted into the cylinder weldment circular groove and bolted against the outer faces of the top head-packing gland assembly to prevent longitudinal movement thereof.

10 Claims, 2 Drawing Figures

CYLINDER END ASSEMBLY

BACKGROUND OF THE INVENTION

The improved cylinder and repair method of this invention find use in a wide variety of equipment employing hydraulic or pneumatic cylinders. The preferred embodiment of this invention was developed to modify obsolete or to repair damaged cylinders employed in rear end loading refuse collecting vehicles of the type manufactured by Leach Company, Harrison and Packer Aves., Oshkosh, Wis. These cylinders are identified as Leach Operating Cylinder Assemblies 2R–1006, and four are required in each rear end loader.

Over lengthy periods of use, these cylinder end assemblies frequently become damaged because the snap ring held in the groove of the cylinder weldment breaks or becomes dislodged from its groove under severe top head pressure. This permits the top head to break loose and the entire cylinder end assembly to fail. The results are usually a scored or bent piston rod, a damaged cylinder weldment and ruined seals.

Another problem concerns the replacement of worn seals. Periodically, the O-ring, V-packing and wiper ring wear out and must be cleaned or replaced. To accomplish this in the Leach 2R–1006 assembly, the packing gland retaining wire must be untwisted and freed, the packing gland must be unscrewed, the V-packing must be dug out, the snap ring must be removed, and the top head must be withdrawn. Then, after all seals have been cleaned and/or replaced, the procedure is reversed. This is a time-consuming and difficult procedure which must be repeated periodically.

It is an object of this invention to provide an improved cylinder end assembly to replace the conventional Leach 2R–1006 assembly which is obsolete. Such a reworked assembly would greatly simplify and shorten the time required for subsequent periodical seal maintenance. It is a further object of this invention to provide a method of reworking obsolete or repairing damage cylinder end assemblies which method is relatively inexpensive to perform, can be carried out in a short time, and which does not require sophisticated, expensive equipment or highly trained workers.

SUMMARY OF THIS INVENTION

In order to achieve these objects, this invention provides a method of repairing or reworking Leach 2R–1006 cylinder end assemblies to replace damaged units or to modify units that have been deemed obsolete. The method discards the originally used packing gland retaining wire, screws and nuts, the snap ring, and the V-packing. The packing gland has its flange cut off and a new wiper ring groove is cut. Then, a fluid sealing ring is dropped into the top head, and the packing gland is screwed tightly flush into the top head. The new O-ring and wiper ring are installed in their grooves and the entire assembly is slidably inserted into the cylinder weldment.

A set of curved locking segments is fabricated and is inserted into the circular cylinder weldment internal groove. The segments are bolted to the outer face of the top head and also bear against the outer face of the packing gland preventing unwanted longitudinal displacement of these two cylinder end elements.

Therefore, a cylinder end assembly has been produced on which the three seals can be easily and quickly replaced by simply unbolting and removing the locking segments, slidably withdrawing the threadably engaged top head-packing gland assembly, replacing or cleaning the seals which were withdrawn with the assembly, reinserting the top head-packing gland assembly and reinserting the locking segments into the cylinder weldment groove and bolting them to the top head.

This improved cylinder end assembly and method of making same achieves the objects previously described by producing an assembly which is extremely strong and which effectively resists the heavy longitudinal forces generated by the reciprocating piston rod. It also facilitates quick, simple and inexpensive seal maintenance. Other advantages will become apparent from the following detailed description of the assembly and method of manufacture.

DESCRIPTION OF THE PREFERRED EMBODIMENT

Figure 1:
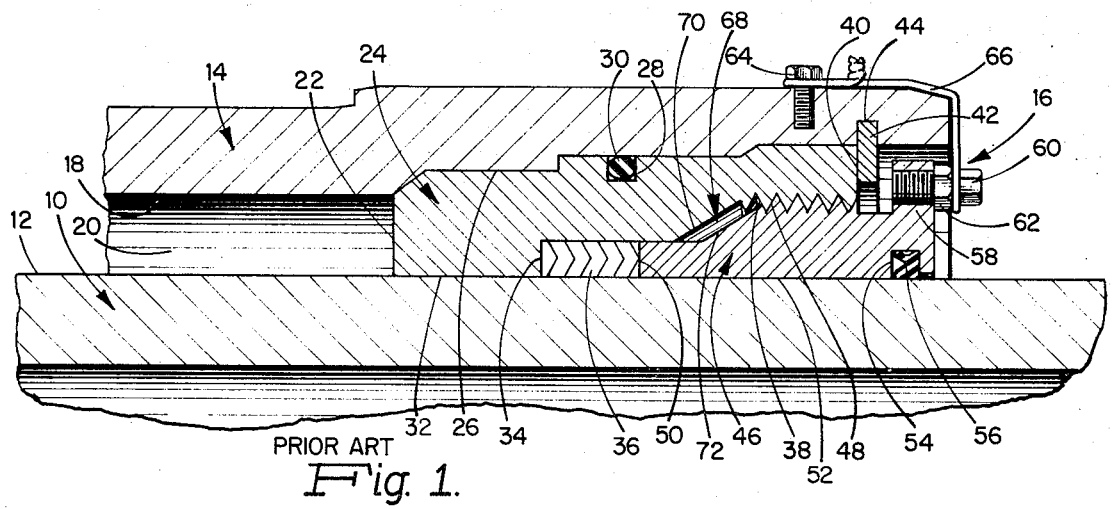
FIG. 1 is an elevation of the prior art Leach 2R–1006 Operating Cylinder Assembly showing in broken away portions the piston rod and the cylinder end assembly.

The primary object of this invention is to overcome the disadvantages of the Leach 2R–1006 Operating Cylinder Assembly shown in FIG. 1. The shown Leach assembly is a portion of an entire hydraulic cylinder having a piston rod which can be reciprocated by the generation of fluid pressure on either side of an unshown piston to which it is fixed at its left end. Power for extending and retracting the piston rod is produced by a pumping system which drives hydraulic fluid through lines opening into the cylinder on both sides of the piston. Control of the piston rod extension is provided by selectively actuated valves. This arrangement is conventional and forms no part of this invention.

FIG. 1 shows a piston rod 10 which is customarily hollow, although it could be solid. Preferably, piston rod 10 is steel and is a relatively long and thin cylinder with a rod surface 12. The piston rod extends and reciprocates through the open cylinder end at the right side of the figure. Typically, the unshown free end of the piston rod (its right end) is linked to and drives a pivot arm or other load-carrying element.

The cylindrical enclosure of the Leach hydraulic cylinder is provided by cylinder weldment 14 which is a hollow cylinder having a closed end (unshown to the left of FIG. 1) and an open end 16. The cylinder weldment has a diameter considerably larger than that of piston rod 10 to permit the piston to be driven back and forth in continuous contact with the interior walls 18 of the cylinder weldment. The empty space 20 shown in FIG. 1 comprises the area along which the piston travels until it strikes the inward face 22 of cylinder top head 24.

Top head 24 is tubular and has exterior walls 26 which conforms to and which bear against the interior walls 18 of cylinder weldment 14 and are restrained thereby from inward movement. The top head exterior walls 26 have a circumferential groove 28 in which an O-ring 30 is mounted in continuous contact with the cylinder weldment interior walls 18 to prevent fluid leakage between the cylinder weldment and the top head.

The top head 24 is usually cast iron or steel and has interior wall portions forming a smooth cylindrical bore 32 along which piston rod 10 is guided and supported during its reciprocal motion. The bore 32 extends inwardly until it meets top head inward face 22. The bore 32 extends outwardly until it meets top head radial rim 34 which abuts a fabric ring-like V-packing 36 and restrains it against inward movement. The top head 24 also has larger diameter threaded interior wall portions 38 which are located outwardly with respect to the top head cylindrical bore 32. Top head 24 furthermore has a radially disposed outward face 40 extending between exterior wall 26 and threaded interior wall 38.

To restrain top head 24 against undesired outward movement, a split, expandable snap ring 42 is mounted in a circular internal groove 44 provided in interior walls 18 of cylinder weldment 14. Groove 44 has parallel walls which are spaced apart approximately the same distance as the thickness of snap ring 42 so that the snap ring achieves a snug mounting in the groove. The snap ring bears against the top head outward face 40 and immobilizes the top head 24 within the cylinder weldment 14, under normal conditions of use.

Packing gland 46 is tubular and has threaded exterior wall portions 48 which permit the packing lgand to be initially screwed partially into the open end of tubular top head 24 thereby slightly compressing V-packing 36 against its inwardly disposed packing gland radial rim 50 and against the surface 12 of reciprocating piston rod 10. Packing gland 46 is usually bronze and has interior wall portions forming a smooth cylindrical bore 52 along which piston rod 10 is guided and supported during its reciprocal motion. The bore 52 extends inwardly until it meets packing gland radial rim 50 which abuts V-packing 36 and compressibly restrains it against outward movement. The bore 52 also extends outwardly until it meets a circular internal groove 54 provided in the interior wall portions of bore 52. A wiper ring 56 is mounted in groove 54 and serves to press against and to wipe dust, grit and the like from the surface 12 of piston rod 10 as it is retracted into the cylinder.

Packing gland 46 has an outwardly disposed flange 58 which has a threaded hole tapped longitudinally therein. A retaining rig is employed for the purpose of preventing undersired unscrewing of the packing gland with respect to the top head. The retaining rig comprises a cap screw 60 carrying a spacer nut 62 threadably inserted flush into the flange bolt hole. A set screw 64 is mounted into a tapped hole in the exterior wall of cylinder weldment 14. A wire 66 is wound around set screw 64 and around cap screw 60 and the wire ends are twisted tightly together. Thus, unless wire 66 is untwisted or breaks, the packing gland 46 cannot unscrew itself or even be purposely unscrewed.

Periodically, the Leach assembly begins to leak hydraulic fluid between V-packing 36 and piston rod 10. When this happens, wire 66 must be untwisted, the packing gland 46 must be screwed further into top head 24 to additionally compress V-packing 36 against pisiton rod 10, and then the ends of wire 66 must again be twisted tightly together. However, it will be noticed in FIF. 1 that in order to provide for this V-packing tightening procedure, an undesirable space 68 is left between two parallel surfaces 70 and 72 of the top head and packing gland, respectively. As the packing gland is screwed into the top head to compress the V-packing, the space shrinks and finally disappears after which time the V-packing cannot be further compressed and must be replaced. Space 68 is undesirable because hydraulic fluid often leaks past this open area.

In order to periodically replace the three fluid seals 30, 36 and 56, the ends of wire 66 must first be untwisted and the wire removed. Then, packing gland 46 is unscrewed out of top head 24 and the V-packing 36 is dug out and discarded. The snap ring 42 is then removed from groove 44 with a special tool. This permits the top head 24 to be slidably withdrawn and the three seals can be cleaned or replaced. Then, the disassembly procedure is reversed and the parts are reassembled.

As mentioned previously, the Leach cylinder end assembly has a tendency to fail, usually when the snap ring 42 breaks or becomes dislodged from its groove 44. When this happens, all that holds the top head 24 and packing gland 46 within the open end 16 of cylinder weldment 14 is the thin wire 66 which promptly breaks permitting the top head and packing gland to blow out of the cylinder end. It is when this happens that the method of repairing the Leach cylinder (which is the subject of this invention) is carried out. Also, the method is recommended even before damage occurs in order to vastly simplify and speed up the seal maintenance procedure.

Figure 2:
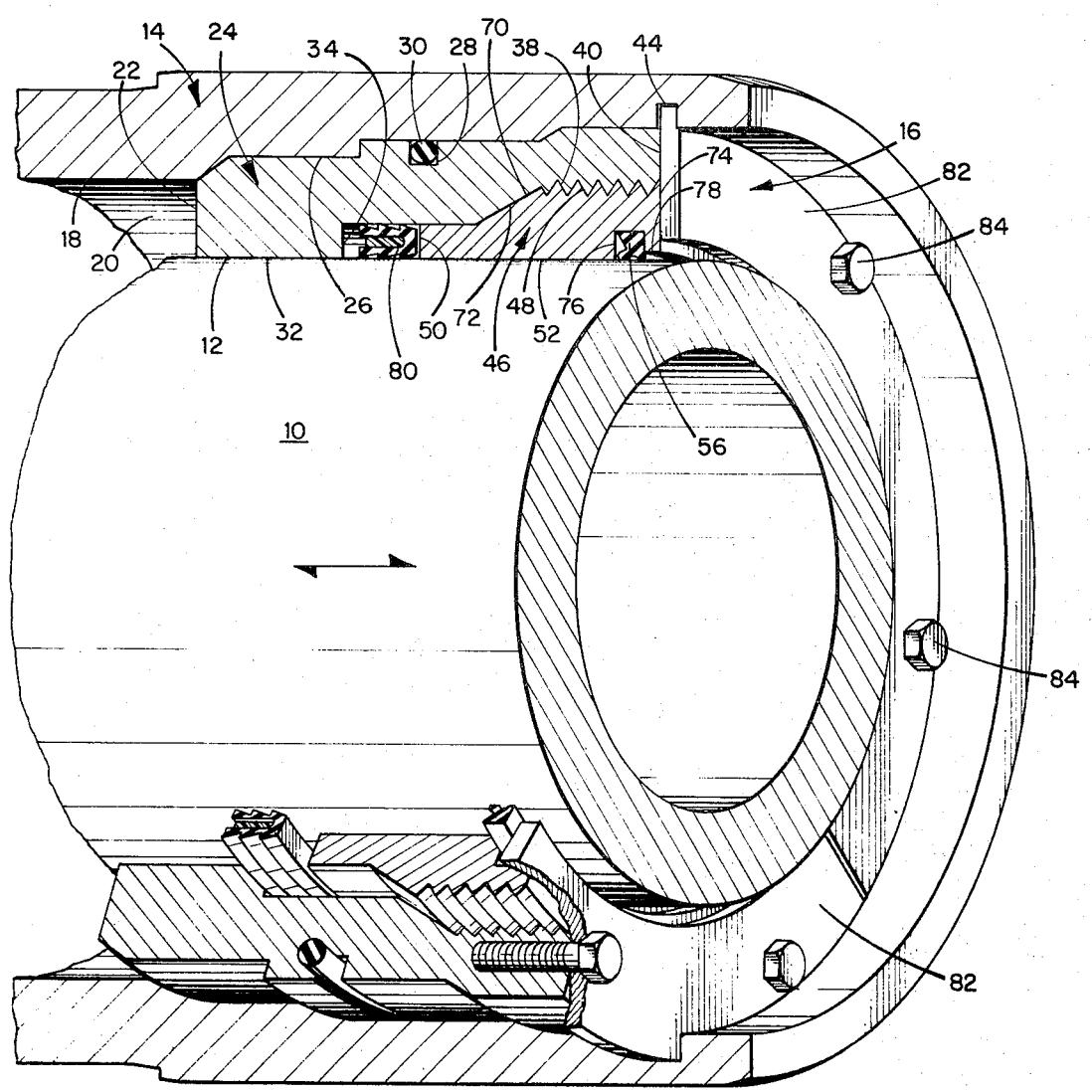
FIG. 2 is a perspective view of the improved cylinder end assembly of this invention showing in broken away portions the piston rod and the cylinder end assembly. This figure represents the completely modified embodiment of the FIG. 1 prior art assembly.

FIG. 2 of the drawings shows the Leach 2R-1066 cylinder end assembly *after* it has been reworked or repaired in accordance with the method of this invention. All FIG. 2 parts have been numbered to correspond to FIG. 1 except those which are new.

When the Leach cylinder becomes damaged or it is decided to modify it before damage occurs, the first step is to untwist wire 66 and discard it together with set screw 64, cap screw 60 and spacer nut 62. Then, packing gland 46 is completely unscrewed out of top head 24 and its wiper ring 56 is pried out and discarded. V-packing 36 is also dug out of its top head recess and is discarded.

With a special tool, snap ring 42 is removed from groove 44 and is discarded. Top head 24 can then be withdrawn from open end 16 of cylinder weldment 14 and O-ring 30 is pried out of groove 28 and is discarded. Longitudinal threaded bolt holes, preferably six, spaced 60° apart, are tapped into outward face 40 of the cylinder weldment.

Flange 58 of packing gland 46 is then cut off so that when the packing gland is screwed tightly into the top head, the packing gland outward face 74 is in planar alignment with (i.e. is flush with) top head outward face 40. A new circular wiper ring groove 76 is also cut into the interior wall portions of the packing gland at a point near outward face 74 and a slightly recessed wall portion 78 is provided therebetween.

Reassembly is begun by installing a new O-ring 30 in top head groove 28. A new wiper ring 56 is installed in packing gland groove 76. Also, instead of using the fabric V-packing 36, an elastic fluid sealing ring 80 is mounted in the top head recess formed by top head radial rim 34. Fluid sealing ring 80 is preferably a Neoprene rubber pressure balanced seal having vanes to resist rotation such as that manufactured by Gorman Co., Inc. Another seal which has proven satisfactory is a molybdenum di-sulfide urethane seal sold under the trademark MAT by Anchor Packing Company. Seal 80 is designed to move longitudinally in its groove while continuously maintaining a complete seal between moving piston rod 10 and stationery top head 24.

After seal 80 is mounted in top head 24 against radial rim 34, packing gland 46 is screwed tightly into top head 24 until parallel surfaces 70 and 72 abut. It has been found advisable to apply a quick-setting liquid adhesive to the threads which prevents subsequent unscrewing of the packing gland. After the packing gland is screwed in tightly, seal 80 can move longitudinally between top head radial rim 34 and packing gland radial rim 50 as piston rod 10 reciprocates.

The top head-packing gland assembly can then be slidably inserted into open end 16 of cylinder weldment 14 and the assembly is restrained against further inward movement by the interior walls 18 of the cylinder weldment. The outward face 40 of the top head is positioned flush with the plane of the inward wall of cylinder weldment groove 44.

Instead of using a narrow snap ring 42, the preferred embodiment of this invention employs three locking segments 82 which are curved and which form a circle when placed together. Rather than three segments, two or more could be used. The locking segments have a longitudinal thickness which is approximately the distance between the parallel walls of circular groove 44 in the cylinder weldment 14. The locking segments have a radial dimension which is approximately equal to the combined radial dimensions of top head outer face 40 and the packing gland outer face 74. Locking segments 82 are provided with longitudinally extending bolt holes, preferably two per segment spaced 60° apart.

The locking segments are inserted into open end 16 of the cylinder weldment and are moved radially outwardly into weldment groove 44. The locking segments bear against both outward faces 40 and 74 of the top head and packing gland, respectively. Then, six bolts 84 are inserted through the locking segment bolt holes and are screwed tightly into the top head bolt holes. This arrangement prevents the threadably engaged top head-packing gland assembly from moving outwardly.

After the just-described method of repairing or reworking the Leach cylinder end assembly has been completed, the cylinder end assembly takes the form shown in FIG. 2. Thereafter, whenever it is desired to replace or clean seals 30, 56, or 80, it is simply necessary to unscrew and remove bolts 84, then remove locking segments 82, and then slide the top head-packing gland assembly out of the cylinder weldment open end 16. The seals can then be replaced or cleaned, and the procedure reversed.

As will be appreciated, this seal maintenance procedure is much quicker and simpler than that previously required with the FIG. 1 prior art Leach construction.

The above description obviously suggests many possible variations and modifications of this invention which would not depart from its spirt and scope. It should be understood, therefore, that the invention is not limited in its application to the details of structure specifically described or illustrated and that within the scope of the appended claims, it may be practiced otherwise than as specifically described or illustrated.

I claim:

1. An improved cylinder end assembly for use in a hydraulic or pneumatic cylinder comprising:
   a. a tubular cylinder weldment having a closed end and an open end, said tubular cylinder weldment having interior walls in which a circular internal groove is provided adjacent to and spaced from said open end, said groove having parallel walls and being oriented in a plane which is perpendicular to the axis of said cylinder weldment;
   b. a tubular top head slidably seated within the open end of said cylinder weldment, said top head having exterior walls which bear against and are restrained against inward movement by said cylinder weldment interior walls, said top head exterior walls being provided with a circumferential groove, a fluid sealing ring mounted within said groove contacting said cylinder weldment interior walls, said top head having interior wall portions forming a smooth cylindrical bore adapted to support and guide a reciprocating piston rod, said top head further having larger diameter threaded interior wall portions disposed outwardly from said bore portions, and having a radially disposed outward face positioned flush with the plane of the inward wall of said cylinder weldment circular internal groove;
   c. a tubular packing gland threadably mounted within the open end of said tubular top head, said packing gland having a radially disposed outer face positioned in planar alignment with said top head outer face, said packing gland having interior wall portions forming a smooth cylindrical bore adapted to support and guide a reciprocating piston rod;
   d. a fluid sealing ring adapted to bear against the reciprocating piston rod, said ring retainably supported against the piston rod by said threadably engaged top head-packing gland assembly; and
   e. a circle of a plurality of curved locking segments slidably inserted into said cylinder weldment circular internal groove, said locking segments each having a radial dimension approximately equal to the combined radial dimensions of said top head and packing gland outer faces, said locking segments bearing against both said outer faces to restrain against outward movement thereof, said segments having retaining means associated therewith for maintaining said segments within said circular groove.

2. The cylinder end assembly of claim 1 wherein said top head has a radially extending rim at the outward side of its said cylindrical bore, said packing gland has a radially extending rim at the inward side of its said cylindrical bore, said two rims being spaced apart, and said fluid sealing ring positioned between said two rims and restrained against longitudinal displacement thereby.

3. The cylinder end assembly of claim 1 wherein said packing gland has interior walls in which a circular interior groove is provided adjacent to and spaced from its outward end, and a wiper ring mounted within said groove adapted to press against the reciprocating piston rod to wipe it clean.

4. The cylinder end assembly of claim 1 wherein said packing gland has exterior wall portions, all said portions being in complete face to face contact with said top head interior wall portions.

5. The cylinder end assembly of claim 1 wherein said circle of a plurality of locking segments includes three identical segments, each segment extending through an angle of 120°.

6. The cylinder end assembly of claim 1 wherein said locking segment retaining means comprises holes tapped longitudinally into said top head outer face, corresponding holes formed in said locking segments, and bolts threadably inserted therein to fix said top head against said segments.

7. The method of repairing or reworking a cylinder end assembly used in a Leach 2R–1006 type of hydraulic or pneumatic cylinder comprising the following steps:
   a. removing the following elements from the open end of the tubular cylinder weldment: the wire, screws and nuts used to prevent the packing gland from becoming unscrewed, the packing gland with its associated wiper ring, the snap ring, and the outer head with its associated O-ring and V-packing;
   b. cleaning or replacing the O-ring which is mounted in a groove in the exterior walls of the top head, inserting a fluid sealing ring in the top head interior wall recess which formerly carried the V-packing, and tapping a plurality of longitudinal threaded bolt holes in the top head outer face;
   c. cutting off the flange of the packing gland, cutting a new groove in the interior walls of the packing gland, and cleaning or replacing the wiper ring which is mounted in the newly cut groove, and threadably inserting the packing gland into the open end of the top head so that the top head and packing gland outer faces achieve planar alignment;
   d. slidably seating said top head-packing gland assembly within the open end of said cylinder weldment; and
   e. fabricating a plurality of curved locking segments having spaced longitudinal bolt holes, said segments having a radial dimension approximately equal to the combined radial dimensions of the top head and packing gland outer faces, inserting the locking segments into the cylinder weldment circular internal groove, and bolting said locking segments to the top head so that the locking segments bear against the top head and packing gland outer faces.

8. The method of claim 7 wherein the packing gland is threadably inserted into the open end of the top head and screwed tightly so that all packing gland exterior wall portions are in complete face to face contact with the top head interior wall portions.

9. The method of claim 8 wherein before the packing gland is threadably inserted into the top head, its threaded portions are coated with an adhesive so that the threadable engagement becomes substantially permanent after the adhesive has set.

10. The method of claim 7 wherein subsequent seal maintenance is accomplished by unscrewing and removing the locking segments, slidably withdrawing the top head-packing gland assembly from the cylinder weldment, cleaning or replacing the O-ring, wiper ring and/or fluid sealing ring, slidably reinserting the top head-packing gland assembly into the cylinder weldment, and reinserting and re-bolting the locking segments to the top head.

* * * * *